United States Patent [19]

Kotaka

[11] Patent Number: 4,928,753
[45] Date of Patent: May 29, 1990

[54] HEAT EXCHANGER

[75] Inventor: Ikuo Kotaka, Hiroshima, Japan

[73] Assignee: Babcock-Hitachi Kabushiki Kaisha, Tokyo, Japan

[21] Appl. No.: 355,109

[22] Filed: May 19, 1989

Related U.S. Application Data

[60] Continuation of Ser. No. 728,869, Apr. 30, 1985, abandoned, which is a division of Ser. No. 622,725, Jun. 20, 1984, Pat. No. 4,616,697.

[30] Foreign Application Priority Data

Jun. 21, 1983 [JP] Japan .................................. 58-110235
Jun. 21, 1983 [JP] Japan .................................. 58-110233
Jun. 22, 1983 [JP] Japan .................................. 58-94949[U]

[51] Int. Cl.$^5$ .............................................. F28D 15/02
[52] U.S. Cl. ............................ 165/104.27; 165/104.14; 165/113
[58] Field of Search ................. 165/104.14, 104.27, 165/917, 113

[56] References Cited

U.S. PATENT DOCUMENTS 4,190,102  2/1980  Gerz ..................................... 165/113
4,196,776  4/1980  Fallon, Jr. et al. ......... 165/DIG. 12
4,216,903  8/1980  Giuffre ....................... 165/DIG. 12

FOREIGN PATENT DOCUMENTS 140093  11/1980  Japan .............................. 165/104.27
155187  12/1980  Japan .............................. 165/104.14
155188  12/1980  Japan .............................. 165/104.27
155190  12/1980  Japan .............................. 165/104.14

Primary Examiner—Albert W. Davis, Jr.
Attorney, Agent, or Firm—Antonelli, Terry, Stout & Kraus

[57] ABSTRACT

A heat pipe apparatus incorporated in a heat exchanger comprises an evaporative pipe group disposed within a flow of a heating fluid, a condenser pipe group located away from the evaporative pipe group, a passage for connecting both pipe groups and for circulating therethrough a working medium, a single passage branching off from the connecting passage between the lower header of the condenser pipe group and the evaporative pipe group, and a second condenser pipe group having its lower header connected to the single passage and its upper header connected to a separator for non-condensible gas. This arrangement provides an improved removal of non-condensible gases.

12 Claims, 5 Drawing Sheets

FIG. 9
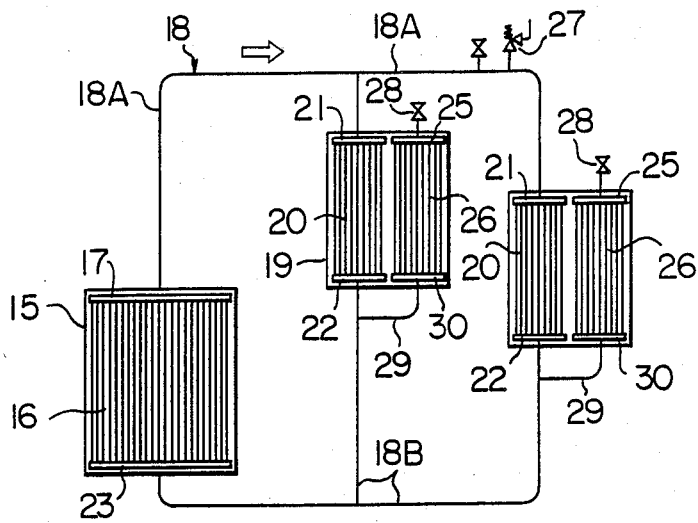
FIG. 9A
FIG. 10
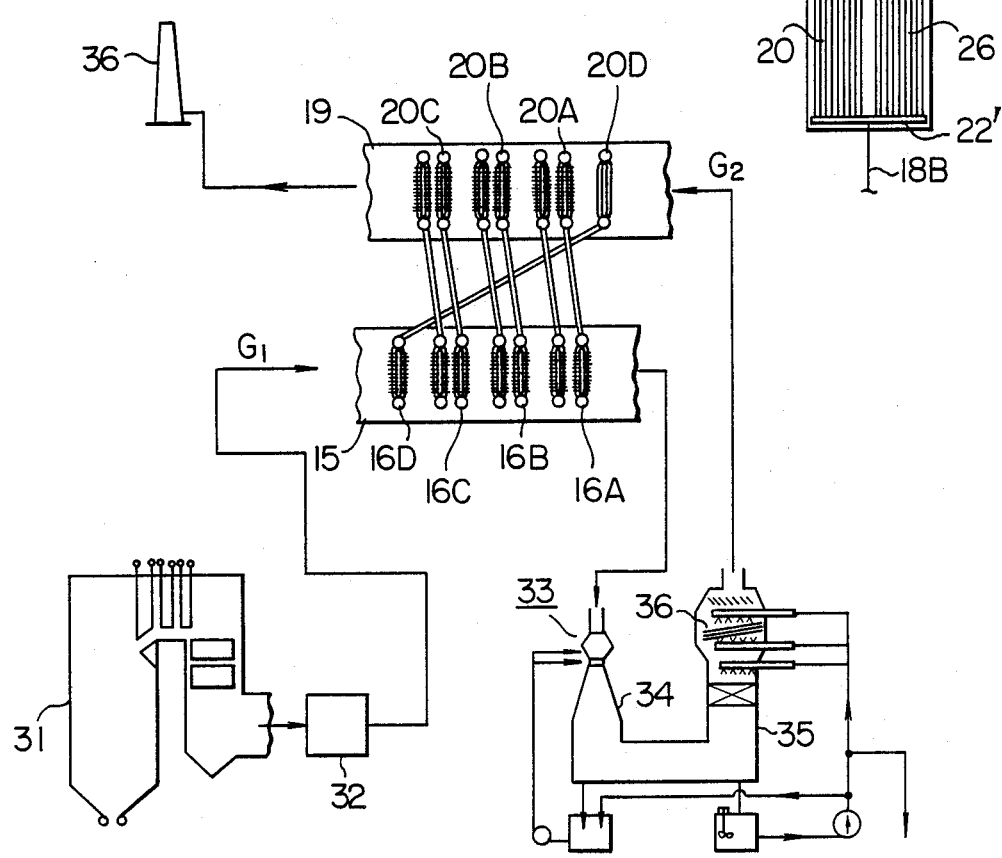

HEAT EXCHANGER

This application is a continuation of application Ser. No. 728,869, filed on Apr. 30, 1985 now abandoned.

BACKGROUND OF THE INVENTION

1. Field of the Invention

The present invention relates to a heat exchanger incorporating therein a heat pipe apparatus which comprises an evaporator section and a condenser section separated from the evaporator section.

2. Description of the Prior Art

Various types of heat exchanger have been used so as to heat two or more fluids to be heated (lower temperature fluid) by means of one heating fluid (higher temperature fluid). A conventional heat exchanger, for example a heat storage rotary type heat exchanger, a multitubular pipe type heat exchanger or plate type heat exchanger among such heat exchangers each necessitates a division of a heating fluid flow into branch flows corresponding to the number of the fluids to be heated, whereby a heat exchange is effected between the branched heating fluid flow and the corresponding fluid to be heated, or necessitates a provision of the heat exchangers within the heating fluid each of which heats the corresponding fluid to be heated.

Under the above-mentioned circumstances, a heat exchanger has been proposed, which incorporates a heat pipe apparatus including an evaporator pipe section disposed within the flow of a heating fluid, condenser pipe section disposed within the flow of a fluid to be heated and located in series and spaced away from the evaporator pipe section, and passage means for connecting both pipe sections to each other. Generally, in this type of heat pipe apparatus which is so called the separate type heat pipe apparatus, it is necessary to provide therein sets of relief valve and non-condensable gas separator. However, as the number of the condenser pipe sections increases, the number of the sets of relief valve and non-condensable gas separator proportionally increases, too. Thus, the number of necessary parts and the cost for the heat exchanger increase.

Further, in the above-mentioned construction wherein both pipe sections are arranged in series, a difference between temperatures of the heating fluid and the heated fluid passing from through the condenser pipe section becomes smaller, so that it is required to increase the quantity of heat being exchanged at the upstream side of the fluid.

SUMMARY OF THE INVENTION

An object of the present invention is to provide a heat exchanger incorporating a heat pipe apparatus, which has no such disadvantages as mentioned above.

Another object of the present invention is to provide a heat exchanger which is improved in respect of corrosion resistance.

Other objects, features and advantages of the present invention will become apparent from the following descriptions of the preferred embodiments made in connection with the accompanying drawings.

BRIEF DESCRIPTION OF THE DRAWINGS

FIG. 9 shows a construction of the heat pipe apparatus according to a third embodiment of the present invention;

FIG. 9A shows a modification of the heat pipe apparatus shown in FIG. 9.

FIG. 10 shows a construction of the heat pipe apparatus according to a fourth embodiment of the present invention applied to a combustion plant unit;

DETAILED DESCRIPTION OF THE PREFERRED EMBODIMENTS

Figure 1:
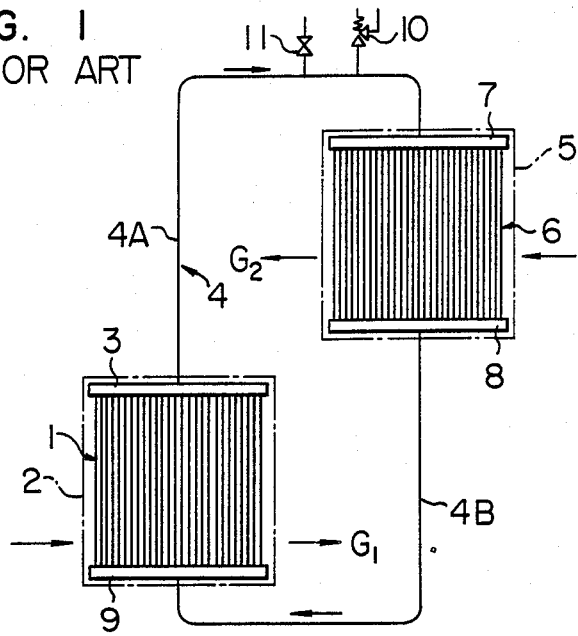
FIG. 1 shows a construction of a conventional separate type heat pipe apparatus.

FIG. 1 shows a structure of the conventional separate type heat pipe apparatus. In this Figure, the reference numeral 1 denotes an evaporative pipe group which is disposed within a duct 2 through which a heating fluid (such as, for example, a gas) G1 passes. A medium in the evaporative pipe group 1 is heated by the heating fluid G1 to become a vapor. The medium vapor is carried from an upper header 3 of the evaporative pipe group 1 through a passage section 4A of a passage 4 to an upper header 7 of a condenser pipe group 6 located within a duct 5 permitting therethrough a flow of a fluid (such as, for example, a gas) G2 to be heated. The medium vapor from the evaporative pipe group 1 is condensed within the condenser pipe group 6 and is allowed to flow from a lower header 8 thereof into a lower header 9 of the evaporative pipe group 1 through a passage section 4B of the passage 4. Since the lower header 8 of the condenser pipe group 6 is located at a higher level than the lower header 9 of the evaporative pipe group 1 is, the medium is put in natural circulation. A relief valve 10 and a non-condensable gas separator 11 are provided in the passage section 4A of the passage 4.

Figure 2:
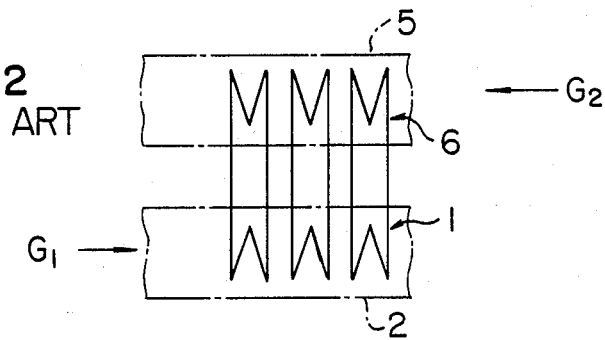
FIG. 2 is a schematic illustration of the apparatus shown in FIG. 1.

FIG. 2 illustrates this structure.

Figure 3:
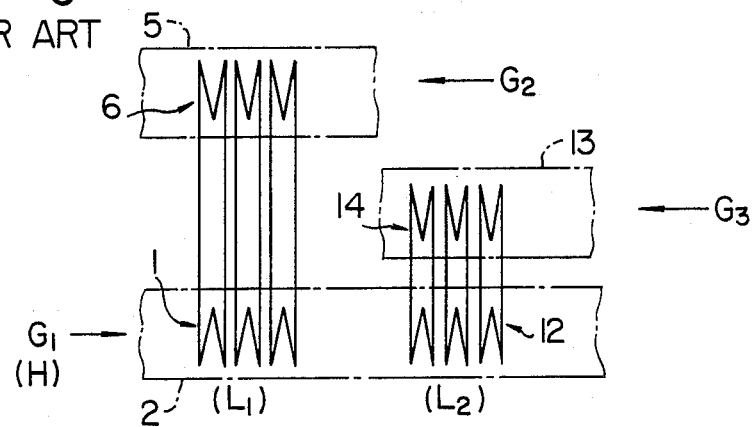
FIG. 3 is a schematic illustration of the conventional separate type heat pipe apparatus arranged to heat two fluids.

FIG. 3 illustrates a heat pipe apparatus arranged to transmit the heat of a high temperature gas G1 (such as, for example, a combustion gas of a furnace) passing through the duct 2 to two fluids G2 (for example, an air for a combustion) and G3 (for example, a fuel gas). Within the duct 2, two different evaporative pipe groups 1 and 12 are respectively disposed. Within the ducts 5 and 13 through which the fluids G2 and G3 pass respectively, the condenser pipe groups 6 and 14 associated with the evaporative pipe groups 1 and 12 are respectively disposed. In this case, six relief valves, the number of which is the same as that of the condenser pipe groups, are necessary, and six non-condensable gas separators are also required. In consequence, the number of necessary parts increases, whereby the cost also increases correspondingly.

Figure 4:
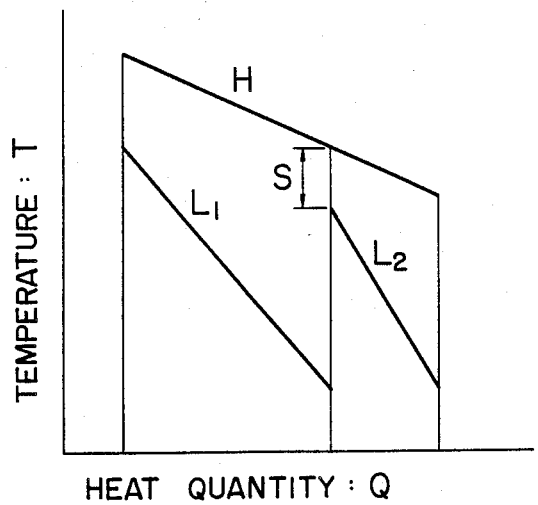
FIG. 4 is a diagram showing the variation in temperature between the fluids in the case of the apparatus shown in FIG. 3.

Furthermore, in the above mentioned series arrangement of the pipe groups, the difference in temperature between the higher temperature fluid and each lower temperature fluid at the outlet disadvantageously becomes small as shown in FIG. 4. As a result, it is necessary to make the quantity of heat to be exchanged at the upstream side large.

Figure 5:
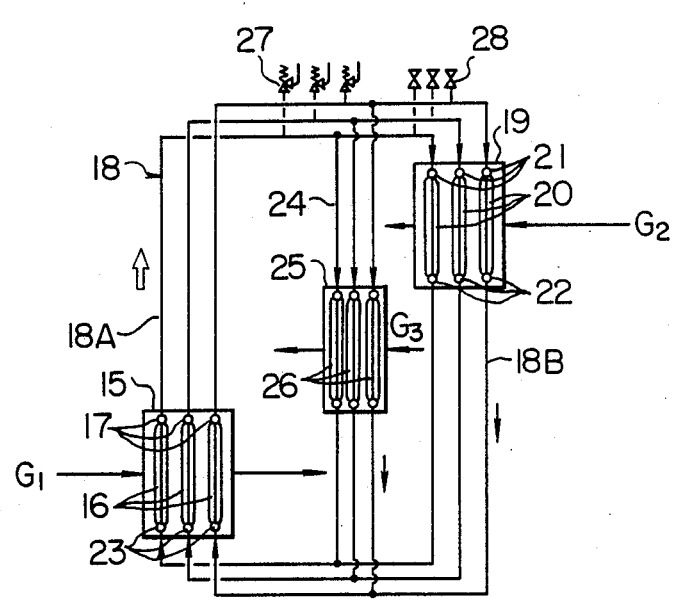
FIG. 5 shows a construction of a heat pipe apparatus according to a first embodiment of the present invention.

FIG. 5 shows the construction of a heat pipe apparatus according to an embodiment of the present invention. Three evaporative pipe groups 16 are disposed with a duct 15 through which a heating fluid G1 flows. A working medium within the evaporative pipe group 16 is heated by the heating fluid G1 to become a vapor. The working medium vapor is sent from the respective upper headers 17 of the evaporative pipe group 16 through a passage section 18A of a passage 18 to corresponding upper headers 21 of three condenser pipe groups 20 within a duct 19 through which a fluid G2 to be heated flows. The working medium vapor is condensed within the condenser pipe groups 20. At this time, heat is transmitted from the working medium to the fluid G2 to be heated. The working medium which is condensed and liquefied flows from the respective lower headers 22 of the condenser pipe group 20 into the respective lower headers 23 of the evaporative pipe groups 16 through passage section 18B. The passage 18 is provided with a sub passage 24 which branches off from the passage 18 and bypasses the condenser pipe group 20. Another condenser pipe group 26 disposed within a duct 25 through which another fluid G3 to be heated flows is provided within the respective sub passage 24. The working medium within the sub condenser pipe group 26 is condensed and a heat of condensation is transmitted to the fluid G3. A relief valve 27 and a non-condensable gas separator 28 are provided with the respective passages 18.

In this embodiment, it is possible to heat two fluids G2 and G3 by means of six condenser pipe groups. Furthermore, only three sets of the relief valve and non-condensable gas separator is used for their purposes.

Figure 6:
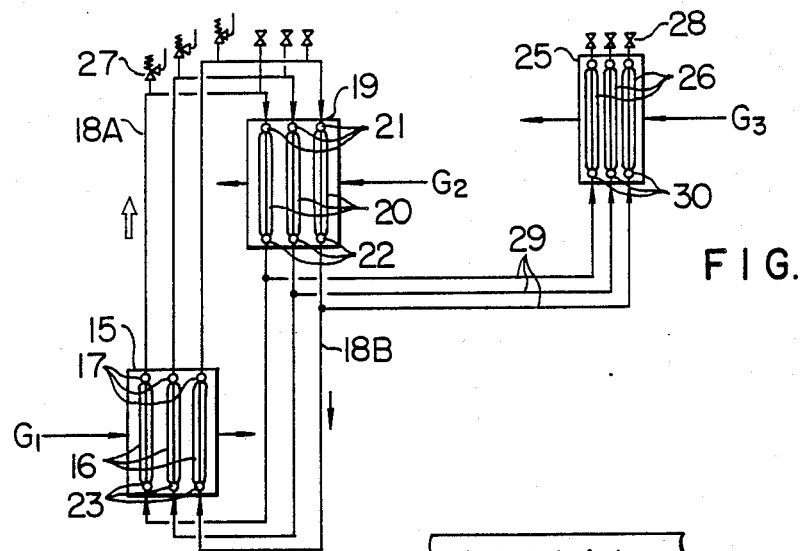
FIG. 6 shows a construction of a heat pipe apparatus according to a second embodiment of the present invention.
Figure 7:
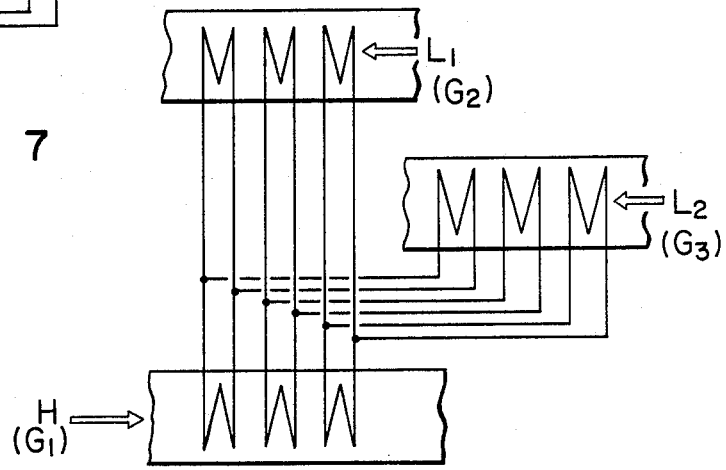
FIG. 7 is a schematic illustration of the apparatus shown in FIG. 6.
Figure 8:
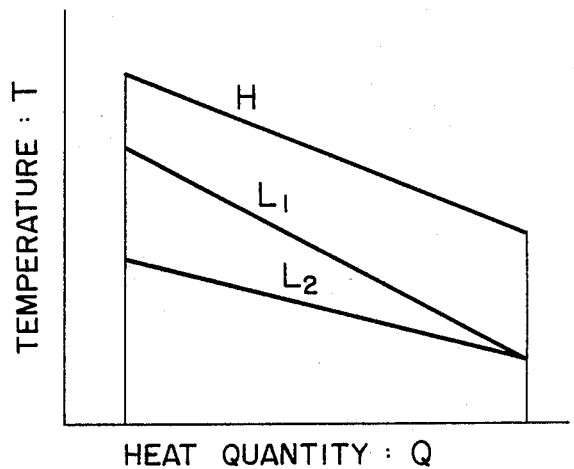
FIG. 8 is a diagram showing the variation in temperature between the fluids in the case of the apparatus shown in FIG. 7.

In FIG. 6, a heat pipe apparatus according to a second embodiment of the present invention is shown. In the embodiments described hereinbelow, the parts or elements having the same functions as those of the preceding embodiment have are denoted by the same reference numerals. In the second embodiment, a sub passage 29 is branched off from the passage section 18B through which the liquefied working medium flows back into the lower header 23 of the evaporative pipe group 16, and is connected to the lower header 30 of the condenser pipe group 26 located within the duct 25 through which the third fluid G3 flows. The vapor and the non-condensable gas within the passage section 18B are removed therefrom and flow into another condenser pipe groups 26, whereby only medium vapor is condensed and the non-condensable gas can be, if necessary, discharged out through the separator 28, so that it is possible to prevent the heat transmission effect from being decreased.

Where the heat pipe apparatus is formed into the above-mentioned structure, i.e., a composite type structure, the variation in temperature is as shown in FIG. 8 and the difference between the temperatures of the heating fluid and each of fluids to be heated at the outlet can be made greater. In this embodiment, therefore, it becomes possible to decrease a heat transmission surface. FIG. 7 is a schematic illustration of the structure of the apparatus shown in FIG. 6.

FIG. 9 shows the heat pipe apparatus according to a third embodiment of the present invention. This third embodiment is substantially the same as the embodiment shown in FIG. 6 in respect of the sub passage 29 which is branched off from the passage section 18B through which the liquefied working medium flows back into the lower header 23 of the evaporative pipe group 16, but is different from the apparatus shown in FIG. 6 in that another condenser pipe group 26 provided with a separator 28 for removing the non-condensable gas is disposed within the same duct 19 or 25 together with the condenser pipe group 20.

The foregoing descriptions, have referred to the embodiment of the separate type heat pipe apparatus in which two fluid, i.e., a second and a third fluid are heated.

However, by means that further sub passages branched off from the passage section are applied to the apparatus shown in FIG. 5, 6 or 9, it is possible to heat a plurality of fluids including a fourth fluid, a fifth fluid and so on.

Furthermore, it is also possible to use a larger lower header 22' instead of the sub passage 29 and the lower header 30 of another condenser pipe group 26, as shown in FIG. 9A.

In FIG. 10, there is shown a fourth embodiment of the present invention which is applied to a combustion plant unit for prevention of a white fume generation by means of raising the temperature of a desulfurized exhaust gas from the combustion apparatus. In this Figure, the exhaust gas from a combustion apparatus 31, e.g. a boiler, flows as a higher temperature exhaust gas G1 through a dust collector 32 into a duct 15 within which are disposed a plurality of evaporative pipe groups 16A to 16C, and in which a heat exchange is performed. Thereafter, the resultant exhaust gas flows into a desulfurizing device 33 and is cooled by a water spray in a cooling tower 34, and is cleaned by a spray of a liquid containing $CaCO_3$ in an absorbing tower 35. The resultant exhaust gas, thereafter, flows through a demister element 36, and then flows as a lower temperature gas G2 into a duct 19 within which are disposed a plurality of condenser pipe groups 20A to 20C and is heated therein and is then exhausted through a chimney 37.

In this case, when the temperature of the condenser pipe group 20A as well as the temperature of the gas G2 is lower, the exhaust gas contains a vapor and thus is discharged through the chimney 36 as a white fume. This is not preferable from the environmental pollution point of view.

The evaporative pipe group 16A is located at a place of the lowest temperature (the most downstream side) with respect to the exhaust gas G1, while the condenser pipe group 20A is located at a place of the lowest temperature (the most upstream side) with respect to the exhaust gas G2. Accordingly, an acid mist can attach onto the pipes and dust, i.e., particles of, for example, $CaSO_4$, $CaCO_3$, etc. are carried into a gap between the pipe fins to jam it whereby heat transfer efficiency decreases and, besides, the evaporative pipe comes to be corroded rapidly. The same phenomenon can be found in other condenser pipe groups 20B, 20C, etc. Such phenomenon can be avoided by replacing all pipes of the condenser pipe groups 20A to 20C by bare pipes having no fin, but many bare pipes, the number of which is four to five times as great as that of the finned pipes otherwise required become necessary from the viewpoint of heat transfer area. Accordingly, as a countermeasure, another evaporative pipe group 16D is disposed at an uppermost stream side with respect to the flow of the exhaust gas G1, whereby a high temperature working medium vapor (for example, 124° C., 2.3 kg/cm$^2$) is generated. This high temperature working medium vapor is sent to another condenser pipe group 20D disposed at an uppermost stream side with respect to the flow of the low temperature gas G2. This means that no mist condenses on the condenser pipe group 20D. In this case, if all condenser pipes are to be bare pipes made of a material having corrosion resistance (for example, SUS stainless steel) and a smooth surface, a remarkable effect is obtained in regard to preventions of mist condensation and of pipe corrosion.

Figure 11:
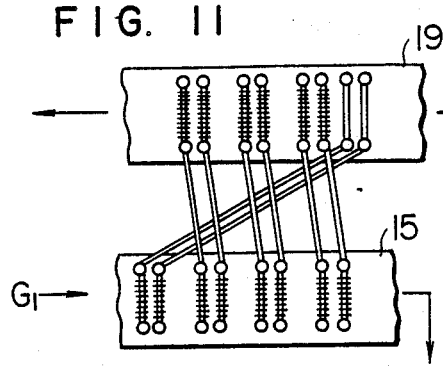
FIG. 11 shows a modification of the heat pipe apparatus shown in FIG. 10.

A plurality of loops for evaporation of mist may be provided as shown in FIG. 11. Further, where the inlet temperature of high temperature side is high and as a result the temperature of the mist evaporation loop or loops becomes too high, whereby it can be considered as being possible that stress corrosion takes place due to, for example C1 in the mist, the temperature of the mist evaporation loop can be set at a suitable value by selecting the high temperature fluid side pipe group position for the mist evaporation loop to be, for example, 20B, 20C, etc.

Further, this means can be applied not only to the transmission of latent heat but also to the transmission of sensible heat.

In this embodiment, by providing a high temperature pipe group for evaporation of mist, it is possible to restrict the extent of corrosion by mist, the extent of attachment of dust, etc. narrowly. Further, by using bare pipes for the condenser pipes, it is also possible to prevent the attachment of dust easily to perform a continuous operation of the apparatus, and to make the time required for the maintenance and inspection short.

In the previous embodiments of the invention, the evaporative pipe group 16 is disposed at a lower level than the condenser pipe group 20. Accordingly, the working medium vapor 22 generated in the evaporative pipe group 16 rises upwards toward the condenser pipe groups 20 and is to be condensed. The condensed working liquid medium in the condenser pipe group 20 flows downwards toward the evaporative pipe group 16. Thus, the working medium can be naturally circulated between the evaporative pipe group and the condenser pipe group through the passage 18. According to the installing conditions, however, it is not always possible to locate the pipe groups in the above mentioned manner. Namely, the evaporative pipe group may be disposed at a higher level than the condenser pipe group. In such a case, it becomes impossible to circulate the working medium naturally and to make a heat exchange unless the working medium is forcedly circulated by means of any suitable means.

Figure 12:
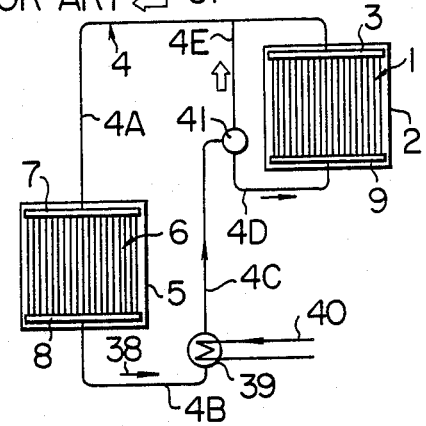
FIG. 12 shows a construction of a prior art heat pipe apparatus of forced circulation type.

To avoid the above suitable means, a forced circulation type heat exchanger shown in FIG. 12 has been proposed. The working medium vapor 37 heated and evaporated by means of a heating fluid in the evaporative pipe group 1 disposed within the duct 2 through which the heating fluid passes flows from the upper header 3 of the evaporative pipe group 1 through a passage section 4A of the passage 4 into the condenser pipe group 6 disposed within the duct 5 through which a fluid to be heated passes. Thus, the working medium vapor 37 releases a heat therefrom and is condensed. The reference numeral 7 denotes upper header of the condenser pipe group 6. A condensate 38 passes from the lower header 8 of the condenser pipe group 6 through a passage section 4B into a bubble producing unit 39. The bubble producing unit 39 is a kind of bubble pump which causes a production of bubbles in the condensate by the use of a heat 40 supplied thereto from outside. The condensate 38 rises, due to a lift force of the bubbles, through a passage section 4C to a liquid-vapor separator 41. The liquid separated by the separator 41 flows through a passage section 4D and the lower header 9 of the evaporative pipe group 1 into the pipe group 1. On the other hand, the vapor (bubbles) separated by the separator 41 flows through a passage section 4E into the passage section 4A and joins into the vapor discharged from the evaporative pipe group 1. According to the above, construction, the working medium is forcedly circulated. The reason why the bubble producing unit is used as a pump for making a forced circulation is that the bubble producing unit has a simple structure, and that the bubbles produced by the heat supplied from outside themselves have a latent heat which can be utilized as a heat source for heating the fluid to be heated. However, since the operation of the bubble producing unit is dependent upon the heat supplied from outside, when the heat from outside is stopped, the working medium ceases to circulate, whereby a function of the heat exchanger itself decreases.

Figure 13:
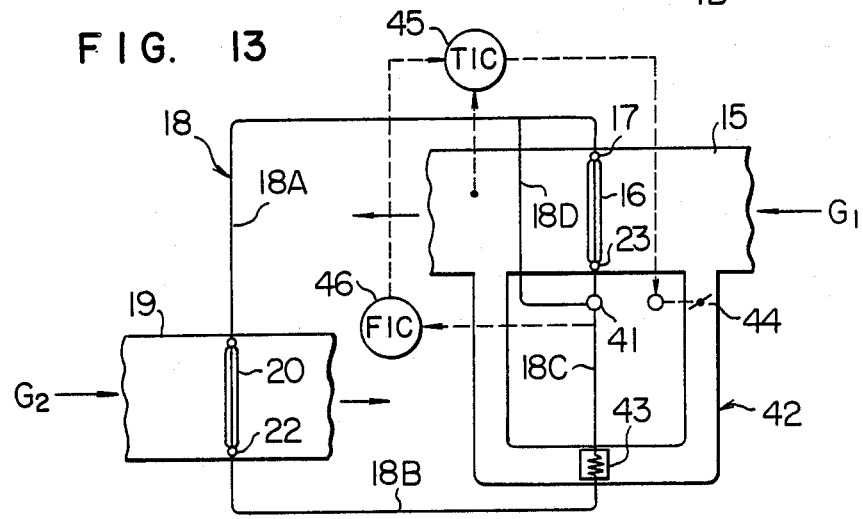
FIG. 13 shows a construction of the heat pipe apparatus according to a fifth embodiment of the present invention; and, FIG. 14 shows a modification of the heat pipe apparatus shown in FIG. 13.

Accordingly, in a fifth embodiment of the present invention shown in FIG. 13, a duct 19 through which a fluid G2 to be heated passes is disposed at a lower level than a duct 15 through which a heating fluid G1 passes. As a result, the evaporative pipe group 16 disposed within the duct 15 is to be located at a higher position than the condenser pipe group 20 disposed within the duct 19. The reference numeral 42 denotes a bypass passage which is branched off from the duct 15 for the heating fluid G1 to bypass the evaporative pipe group 16. A bubble producing unit 43 is disposed within the bypass passage 42, and the bubble producing unit 43 is connected to the lower header 23 of the evaporative pipe group 16 by means of a passage section 18C of the passage 18. The reference numeral 44 denotes a damper provided within the bypass passage 42.

The operation of the heat pipe apparatus will now be described. The working medium which has released its heat therefrom and thus been condensed in the condenser pipe group 20 flows through the lower header 22 and the passage section 18B to the bubble producing unit 43. At the unit 43, the condensate is heated by a part of the heating fluid G1 passing through the bypass passage 42 and generates bubbles. Thereafter, the condensate is rised to the liquid-vapor separator 41 through the passage section 18C due to a lift force of the bubbles, produced to reach a liquid-vapor separator 41. Thus, the separated condensate flows into the evaporative pipe group 16, while the bubbles flow into the passage section 18D and join into the vapor from the evaporative pipe group 16 through the upper header 17 thereof to be supplied to the condenser pipe group.

When, in the above case, the temperature of the heating fluid G1 is not so high, it is feared that a low temperature corrosion occurs at the downstream side of the evaporative pipe group. A temperature indicator controller (TIC) 45 is provided for preventing the occurrence of the low temperature corrosion. Namely, the TIC measures a temperature of the fluid at the downstream side of the evaporative pipe group 16 and controls the opening of the damper 44. That is, when the temperature of the heating fluid G1 descreases, the opening of the damper 44 is made small to cause a reduction of the liquid flow rised due to the bubble produced in the unit 43 to thereby cause a reduction in an amount of working medium circulation and to thereby prevent the fluid temperature at the downstream side of the evaporative pipe group from being decreased down to a predetermined value. In this case, the flow rate of the rising working medium may be measured by a flow rate indicator controller (FIC) 46 and the measurements are inputted into the TIC 45 to effect a cascade control.

Figure 14:
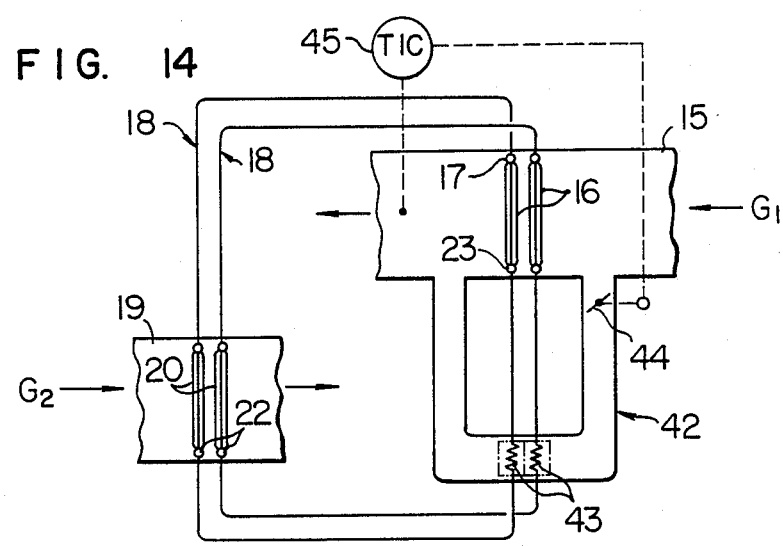

The heat pipe apparatus shown in FIG. 14 is a type prepared by duplicating the circulation passage of working illustrated in FIG. 13. In this apparatus, the amount of heating fluid being supplied to the vapor generators 43, 43 is not greater than 10% of the whole amount thereof, and the amount of heat in this heating fluid joins, in the form of a latent heat, into the vapor heat from the evaporative pipe group through the bubbles in the liquid and is utilized, whereby a thermal loss takes place little.

According to this last-mentioned embodiment, it is possible, while taking advantage of the merits of the bubble generator, to perform the operation of the heat exchanger on an always stable basis without being affected by an external heat source.

What is claimed is:

1. A heat exchanger incorporating a heat pipe apparatus, said heat pipe apparatus comprising:
   evaporative pipe group means disposed within a flow of a heating fluid;
   first condenser pipe group means for transmitting heat outside thereof, spaced from said evaporative pipe group means;
   first passage means for connecting said evaporative pipe group means with said first condenser pipe group means and for circulating therethrough a working medium between said evaporative pipe group means and said first condenser pipe group means;
   second condenser pipe group means for transmitting heat outside thereof and operatively associated with said evaporative pipe group means;
   said first condenser pipe group means and said second condenser pipe group means being disposed within at least one flow of fluid to be heated;
   second single passage means for connecting a lower header of said second condenser pipe group means with said first passage means between a lower header of said first condenser pipe group means and said evaporative pipe group means for improving removal of non-condensible medium; and
   separator means for non-condensible gas provided at an upper header of said second condenser pipe group means, through which an interior portion of said second condenser pipe group means is to be communicated with an exterior portion thereof.

2. A heat exchanger as claimed in claim 1, wherein a passage section branches off from one of the first passage means and said second passage means between said evaporative pipe group means and said first condenser pipe group means.

3. A heat exchanger as claimed in claim 2, wherein said first condenser pipe group means and said second condenser pipe group means are disposed within a flow of a fluid to be heated.

4. A heat exchanger as claimed in claim 3, wherein said passage section of the second passage means consists of a common header attached to the respective pipes of said first condenser pipe group means and the pipes of said second condenser pipe group means.

5. A heat exchanger as claimed in claim 2, wherein said passage section branches off from the second passage means and is disposed between the lower header of first condenser pipe group means and a lower header of said evaporative pipe group means.

6. A heat exchanger as claimed in claim 1, wherein said first condenser pipe group means and said second condenser pipe group means are disposed within flows of different fluids to be heated.

7. A heat exchanger as claimed in claim 1, wherein said upper header of said second condenser pipe group means contains only non-condensible gas.

8. A heat exchanger according to claim 1, wherein said second passage means includes at least two passage sections branching off from the first passage means.

9. A heat exchanger according to claim 8, wherein said passage sections of said second passage means branch off from a passage section of said first passage means connecting a header of said evaporative pipe group means disposed upstream of flow of said working medium with a header of said first condenser pipe group means disposed downstream of flow of said working medium, and passage sections of said second passage means connected to a lower header of said second condenser pipe group means.

10. A heat exchanger incorporating a heat pipe apparatus, said heat pipe apparatus comprising:
    evaporative pipe group means disposed within a flow of a heating fluid;
    first condenser pipe group means spaced from said evaporative pipe group means and disposed within a flow of fluid to be heated for transmitting heat to an exterior portion thereof;
    first passage means for connecting said evaporative pipe group means with said first condenser pipe group means and for circulating therethrough a working medium between said evaporative pipe group means and said first condenser pipe group means;
    second condenser pipe group means for transmitting heat to an exterior portion thereof and operatively associated with said evaporative pipe group means so as to be disposed within the same flow of fluid as are said first condenser pipe group means, and provided at an upper header thereof with a free end which is separated from said first condenser pipe group means;
    second single passage means for connecting a bottom part of said second condenser pipe group means with said first passage means between a lower header of said first condenser pipe group means and said evaporative pipe group means for improving removal of non-condensable medium; and
    separator means for non-condensable gas provided at the free end of the upper header of said second condenser pipe group means containing only non-condensable gas, through which an interior portion of said second condenser pipe group means is to be communicated with an exterior portion thereof.

11. A heat exchanger as claimed in claim 10, wherein a passage section branches off from one of said first passage section means and said second passage means between said evaporative pipe group means and said first pipe group means.

12. A heat exchanger as claimed in claim 11, wherein said passage section is disposed between the lower header of said first condenser pipe group means and a lower header of said evaporator pipe group means.

* * * * *